United States Patent
Barney

(10) Patent No.: US 9,675,060 B2
(45) Date of Patent: Jun. 13, 2017

(54) HEATED GAME CALL

(71) Applicant: Lance Barney, Princeton, IN (US)

(72) Inventor: Lance Barney, Princeton, IN (US)

(*) Notice: Subject to any disclaimer, the term of this patent is extended or adjusted under 35 U.S.C. 154(b) by 0 days.

(21) Appl. No.: 14/707,860

(22) Filed: May 8, 2015

(65) Prior Publication Data
US 2016/0324141 A1 Nov. 10, 2016

(51) Int. Cl.
*A63H 5/00* (2006.01)
*A01M 31/00* (2006.01)

(52) U.S. Cl.
CPC .................. *A01M 31/004* (2013.01)

(58) Field of Classification Search
CPC ............. A01M 31/004; A63B 2071/0625
USPC .................................... 446/201–209
See application file for complete search history.

(56) References Cited

U.S. PATENT DOCUMENTS

| | | | | |
|---|---|---|---|---|
| 4,700,606 A | * | 10/1987 | Toyama | G10D 7/023 84/380 C |
| 4,742,755 A | * | 5/1988 | Peterson | G10G 7/00 219/201 |
| 5,920,022 A | * | 7/1999 | Ashwood, Jr. | G10D 9/00 219/201 |
| 6,159,067 A | * | 12/2000 | Willis | A01M 31/004 206/315.11 |
| 6,878,032 B1 | * | 4/2005 | Paquette | A01M 31/004 206/315.11 |
| 2007/0249257 A1 | * | 10/2007 | Marsh | A01M 31/004 446/207 |

* cited by examiner

*Primary Examiner* — Nini Legesse
(74) *Attorney, Agent, or Firm* — Gary K. Price

(57) ABSTRACT

A heated game call used to attract wild game for hunting or observation, generally including a cylindrical barrel, a reed member, and a heating element integral to the barrel and positioned near the reed element. Electrical current is provided to the heating element via wires resulting in the heating of the barrel of the call and, the electrical current is provided by batteries that are contained within a compartment of the call. The barrel includes an exterior layer and an interior layer. The heating element preferably is sandwiched between the layers and positioned near the reed member.

14 Claims, 2 Drawing Sheets

HEATED GAME CALL

CROSS REFERENCES TO RELATED APPLICATIONS

U.S. Provisional Application Patent No. 62/004,568, filed May 29, 2014, with title "Heated Game Call" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable.

BACKGROUND OF THE INVENTION

1. Field of the Invention

This invention relates generally to game calls, and more particularly to a game call that includes a heating element to avoid portions of the call, including the reed from freezing.

2. Brief Description of Prior Art

Game calls are widely used to attract wild game for hunting or observation. Many of these calls, including duck, goose, deer and predator calls, are designed to be held in a user's hand while air is forced into the call from the mouth of the user, causing vibration of a reed within the call.

In many cases, the calls are used in cold temperature conditions. The cold temperatures may cause moisture from the breath of the user to freeze the reed to the adjacent portions of the call, resulting in either no sound or very unrealistic sound. This freezing of the reed is particularly an issue in situations where there are extended periods of non-use of the call while waiting for game to approach within calling range.

There is known in the art an insulation wrap to be placed around the barrel of the call, that may include a heat pack to warm the call. Unfortunately, this device is awkward to use, adds significantly to the bulk of the call and may affect the quality of the sound made by the call. In addition, in this device the heat is applied to the exterior surface of the barrel of the call.

As will be seen from the subsequent description, the preferred embodiments of the present invention overcome disadvantages of the prior art. In this regard, the present invention discloses a heated game call having a heated element that is integral to the call and therefore not applied merely to the exterior surface of the call. Instead, heat is provided within the inner portion of the call where the reed is located.

SUMMARY OF THE INVENTION

A heated game call used to attract wild game for hunting or observation. The game call generally including a cylindrical barrel, a reed member, and a heating element integral to the barrel and generally surrounding the reed element. A hole through the barrel allows the passage of air through the barrel and across the reed. Electrical current is provided to the heating element resulting in the heating of the interior of the call. Electrical current is provided by batteries that are preferably contained within a compartment within a portion of the call.

BRIEF DESCRIPTION OF THE DRAWINGS

In the accompanying drawings, I have illustrated a present preferred embodiment of my invention in which.

DESCRIPTION OF THE PREFERRED EMBODIMENT

Figure 1:
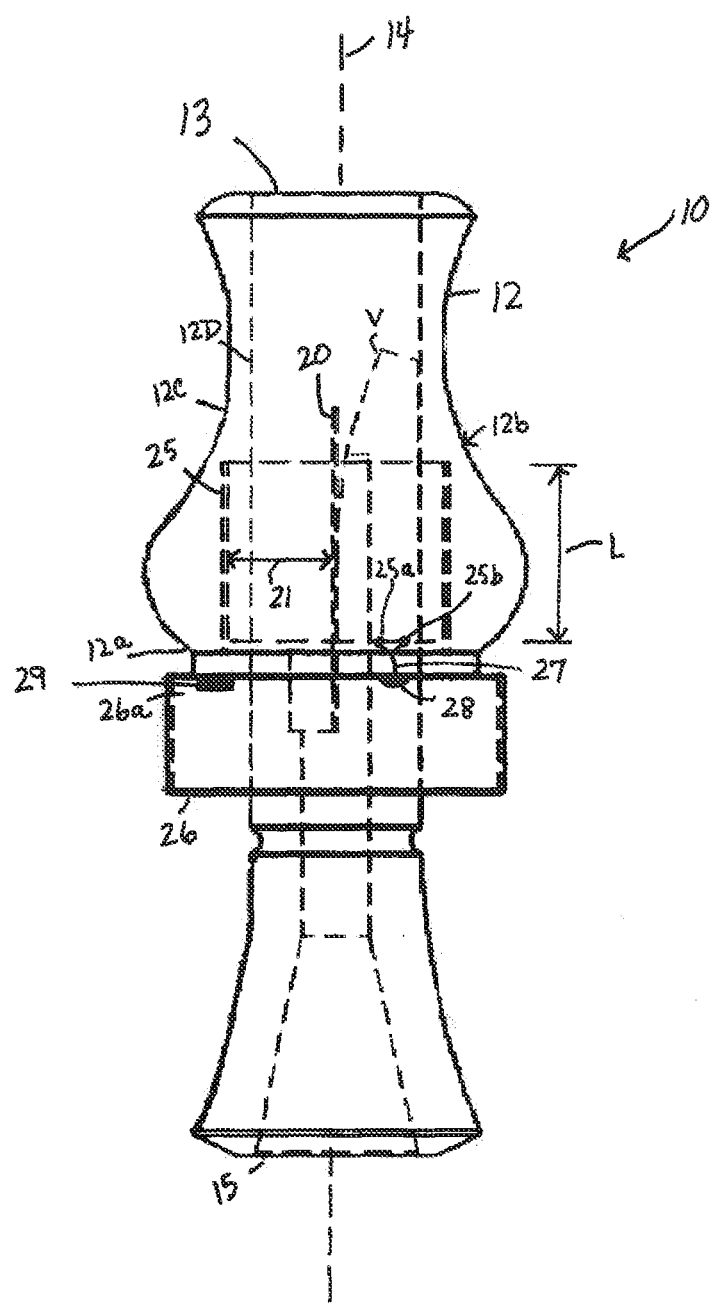
FIG. 1 is a side, sectional view of the present invention, a heated game call.
Figure 2:
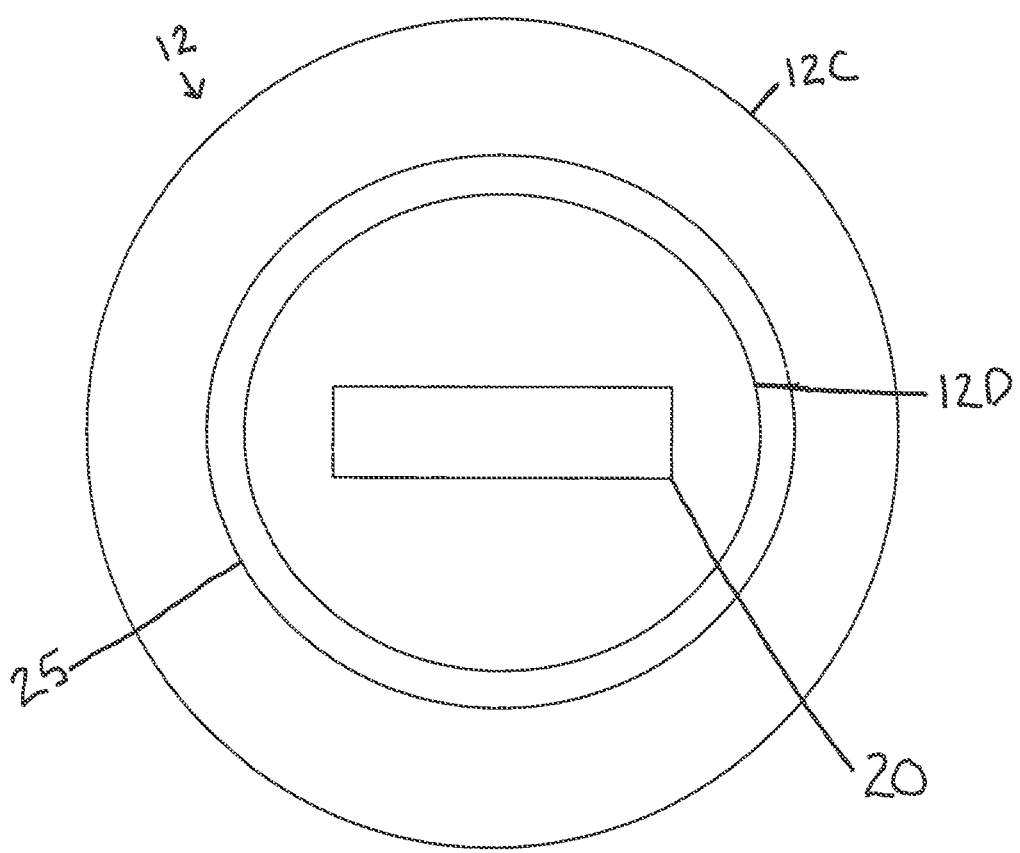
FIG. 2 is a first end view of the heated game call illustrated in FIG. 1.

The present invention is to a heated game call designated as numeral 10 that is used to attract wild game for hunting or observation. Mouth-operated game calls are typically constructed with two primary parts, a barrel 12 with a cylindrical hole 13 through the center 14 and a reed member 20 positioned within the barrel 12. Reed member 20 may include one or more individual reed elements. The hole 13 through the barrel 12 allows the passage of air through the barrel and across the reed. As known, the user blows into the top end 13 of the barrel and the breath causes vibration "V" of the reed 20 as it passes out of the call through the opposite end hole 15. Variations on this configuration are also used, and this invention is not limited to this particular game call configuration.

In the preferred embodiment as shown in FIG. 1, the barrel 12 of the call 10 is preferably made of a molded plastic material. A heating element 25 is disposed within the barrel 12 of the call 10. The plastic material is electrically non-conductive and the heating element 25 may be located within the material without separate insulation.

Suitable heating elements are well known in the art and generate heat as a result of the electrical resistance of the element. In this embodiment, the heating element is molded into the barrel of the call at the time of fabrication of the barrel. Preferably, the heating element 25 is located near the interior surface of the barrel 12 and generally surrounds the reed 20 within the barrel.

As illustrated, a spacing 21 exists between the reed 20 and heating element 25. As further illustrated, the heating element 25 has a length L that vertically extends from a lower most end 12a of the barrel 12 to an approximate midway point 12b of the barrel so that the heating element 25 surrounds at least a portion of the length of the reed member 20 as illustrated.

The call 10 further defines a compartment 26 adjacent the cylindrical barrel 12. The compartment 26 sized for receiving a battery (not shown) therein. The compartment 26 includes an open and closed cap 26a. The battery is a conventional battery that as will be described, is in electrical communication with the heating element 25 that surrounds the reed member 20.

In the preferred embodiment, the heating element 25 is a heat-generating electric resistor.

In application, the battery is disposed within the compartment 26 and a wire 27 is electrically connected between the battery and the heating element 25. In particular, one end of the wire is appropriately connected to the battery and the opposite end of the wire is appropriately connected to the positive and negative contacts 25a, 25b of the heating element 25. An indent 28 may be disposed between the barrel 12 and compartment 26, the indent 28 for receiving the wire 27 as it extends from the compartment 26 to the heating element 25 within the barrel 12 as described.

A switch 29 is also provided on an exterior surface of the compartment 26 and is in electrical communication with the battery. The switch 29 permits activation of the heating element 25 and deactivation of the heating element without removal of the battery. Temperature sensors, regulators and control circuits well known in the art may also be included to improve control of the temperature of the call.

As illustrated, the heating element 25 is preferably integral to the barrel 12 of the call. In particular, the barrel 12 includes an outer, or exterior layer 12C, and an interior layer 12D. In the preferred embodiment, the heating element 25 is effectively sandwiched between the layers 12C, 12D and positioned near the reed member 20. In this situation, the heating element 25 would generally be intended to prevent freezing of the reed since the heating element 25 would be spaced adjacent the reed 20. The heating element 25 could be molded within the interior layer 12D or could be installed adjacent a surface of the interior layer 12D that would surround the reed member 20 when the call 10 is assembled.

In using the preferred embodiment of this heated game call, the call 10 is activated by inserting the battery in the battery compartment 26 and activating the switch 29. Activating the switch 29 completes the circuit, and electrical current passes through the heating element 25 and maintains the interior of the call at a temperature above freezing. The user may then blow into the barrel 12 of the call to make the appropriate sounds. After calling, any moisture in the call does not freeze and the call remains ready for immediate use at the next appropriate time, even if the ambient temperature is below freezing and an extended period of time passes before game is again within calling range.

Although the description above contains many specificities, these should not be construed as limiting the scope of the invention but is merely providing illustrations of some of the presently preferred embodiments of this invention. As such, it is to be understood that the present invention is not limited to the embodiments described above, but encompasses any and all embodiments within the scope of the claims.

It would be obvious to those skilled in the art that modifications may be made to the embodiments described above without departing from the scope of the present invention. Thus the scope of the invention should be determined by the appended claims in the formal application and their legal equivalence, rather than by the examples given.

I claim:

1. A heated game call comprising:
    a barrel, said barrel having an interior layer and an exterior layer,
    a reed member disposed in the center of said barrel, and
    a heating element disposed between said interior layer and said exterior layer, said heating element having a circular configuration that encircles the reed member, and wherein an equal spacing is defined between an interior surface of said heating element and an outside surface of said reed member, wherein electrical current is provided to the heating element for heating of the interior,
    wherein said heating element has a length that extends from a lower most end of the barrel to an approximate midway point of the barrel, and
    a compartment adjacent an exterior side of said lower most end of the barrel for receiving at least one battery for providing said electrical current, said compartment including a cap having an open position and a closed position,
    an indent disposed between said barrel and said compartment, said indent configured for receiving an electrical wire that extends from the compartment to the heating element, and
    a switch disposed on an exterior surface of said compartment, said switch in electrical communications with said at least one battery.

2. The heated game call as recited in claim 1, wherein said heating element is adjacent the interior surface.

3. The heated game call as recited in claim 1, wherein said barrel is constructed of a molded plastic material.

4. The heated game call as recited in claim 3, wherein said plastic material is electrically non-conductive.

5. The heated game call as recited in claim 1, wherein at least a portion of the reed member is surrounded by said heating element.

6. A heated game call comprising:
    a barrel, said barrel having an interior that defines an interior surface,
    a reed member disposed in said interior, and
    a heating element disposed in said interior adjacent said interior surface of the barrel, and wherein said heating element having a circular configuration that completely encircles said reed member such that an equal spacing is defined between an interior surface of said heating element and an outside surface of said reed member, and an approximate equal spacing is defined between an exterior surface of said heating element and the interior of said barrel, said heating element having a length that extends from a lower most end of the interior to an approximate midway point of the barrel,
    a compartment adjacent an exterior surface of said lower most end of said barrel for receiving at least one battery for providing an electrical current to the heating element for heating the interior, and an indent disposed between said barrel and said compartment, said indent configured for receiving an electrical wire that extends from the compartment to the heating element.

7. The heated game call as recited in claim 6, wherein said barrel having an exterior surface, and wherein said heating element is sandwiched between said interior and exterior surfaces.

8. The heated game call as recited in claim 6, wherein at least a portion of the reed member is surrounded by said heating element.

9. A heated game call comprising:
    a barrel, said barrel having an exterior surface and an interior that defines an interior surface,
    a reed member positioned in said interior,
    a circular heating element that encircles said reed member such that an approximate first equal spacing is defined between an interior surface of said heating element and an outermost perimeter of said reed member, and
    an approximate second equal spacing is defined between an exterior surface of said heating element and said interior surface of said barrel, said heating element having a length that extends from a lower most end of the barrel to an approximate midway point of the barrel such that at least a portion of the reed member's length is surrounded by said heating element,
    a compartment adjacent said exterior side of said barrel's lower most end, said compartment for receiving at least one battery for providing an electrical current to the heating element for heating of the interior.

10. The heated game call as recited in claim 9, wherein heating element is sandwiched between said interior and exterior surfaces.

11. The heated game call as recited in claim 9, wherein said heating element is adjacent the interior surface.

12. The heated game call as recited in claim 9, wherein said electrical current is provided to the heating element via at least one wire electrically connected between the at least one battery and the heating element.

13. The heated game call as recited in claim 12, further including an indent that defines a path between the lower most end of the barrel and the compartment for receiving the at least one wire.

14. The heated game call as recited in claim 13, further including a switch in electrical communication with the at least one battery.

* * * * *